(12) United States Patent
Hsu et al.

(10) Patent No.: US 7,942,532 B2
(45) Date of Patent: May 17, 2011

(54) PROJECTING DEVICE HAVING A HEAT-DISSIPATING MECHANISM

(75) Inventors: Nien-Hui Hsu, Hsinchu (TW); Shang-Hsuang Wu, Hsinchu (TW); Pel-Yu Wu, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 575 days.

(21) Appl. No.: 12/075,851

(22) Filed: Mar. 14, 2008

(65) Prior Publication Data
US 2008/0304020 A1 Dec. 11, 2008

(30) Foreign Application Priority Data
Jun. 8, 2007 (TW) .............................. 96120729 A (51) Int. Cl.
*G03B 21/26* (2006.01)
(52) U.S. Cl. ............. 353/57; 353/58; 362/264; 362/294
(58) Field of Classification Search .................... 353/31, 353/57–61; 345/156; 362/264, 294
See application file for complete search history.

(56) References Cited

U.S. PATENT DOCUMENTS 6,340,237 B1 * 1/2002 Koga et al. .................... 362/294
2004/0263797 A1 * 12/2004 Russell et al. ................... 353/57

* cited by examiner

*Primary Examiner* — Francis M Legasse, Jr.
(74) *Attorney, Agent, or Firm* — David N. Lathrop (57) ABSTRACT

A projecting device includes a casing, an optical engine, and a heat-dissipating mechanism. The casing includes a lower casing body and an upper casing body covering the lower casing body. The optical engine is disposed in the casing, and includes a light source module. The heat-dissipating mechanism includes a first blower disposed uprightly in the casing and adjacent to one side of the light source module for driving airflow to cool the light source module and the casing. The first blower has a thickness greater than one half of a length thereof and greater than one half of a width thereof. With the arrangement of the first blower, a sufficient amount of airflow is provided to the system to improve the heat-dissipating effect and to enhance system reliability.

17 Claims, 8 Drawing Sheets

| System Fan | | | Actual airflow amount of system fan (CFM) | Total system airflow amount (CFM) |
|---|---|---|---|---|
| Dimensions & Type | Max. airflow amount of each fan (CFM) | Max. static pressure of each fan (in H$_2$O) | | |
| Projector 1 | 2 axial fans 45mm×45mm×15mm | 10.3 | 0.10 | 5.9 | 8.1 |
| Projector 2 | 2 axial fans 45mm×45mm×15mm | 10.3 | 0.10 | 9.7 | 12.8 |

| | System Fan | | | |
|---|---|---|---|---|
| | Dimensions & Type | Max. airflow amount of each fan (CFM) | Max. static pressure of each fan (in H$_2$O) | Actual airflow amount of system fan (CFM) | Total system airflow amount (CFM) |
| Projecting device 300 | Two first blowers 45mm×45mm×40mm | 8.03 | 0.316 | 10.1 | 12.8 |

FIG. 10

PROJECTING DEVICE HAVING A HEAT-DISSIPATING MECHANISM

CROSS-REFERENCE TO RELATED APPLICATION

This application claims priority of Taiwanese Application No. 096120729, filed on Jun. 8, 2007.

BACKGROUND OF THE INVENTION

1. Field of the Invention

The invention relates to a heat-dissipating mechanism for a projecting device, more particularly to a heat-dissipating mechanism for a thin-type projecting device.

2. Description of the Related Art

Figure 1:
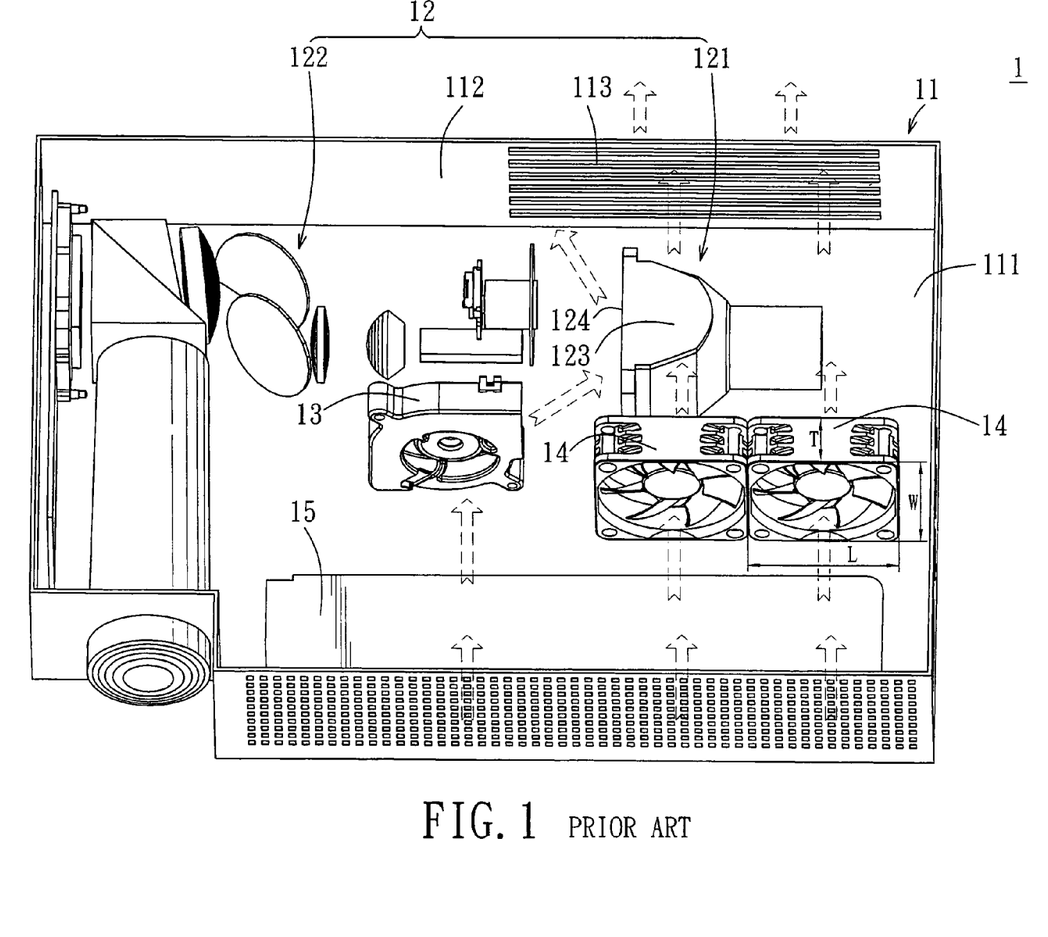
FIG. 1 is a schematic view showing an interior of a conventional projector.

Referring to FIG. 1, a conventional projector 1 includes a casing 11, and an optical engine 12, a blower 13, two axial fans 14, a power supply 15, and a control circuit board (not shown) disposed in the casing 11. The casing 11 includes a lower casing body 111 and an upper casing body (not shown) covering the lower casing body 111. The optical engine 12 includes a light source module 121 disposed in the lower casing body 111, and an imaging module 122. The light source module 121 includes a lampshade 123 and a burner (not shown) disposed in the lampshade 123. The light source module 121 generates lighting power of 200 W. The control circuit board is disposed on a bottom face of the upper casing body, and is connected electrically to the imaging module 122 for controlling images projected by the imaging module 122. The blower 13 is disposed at a front left side of an open end 124 of the lampshade 123 for driving air currents to cool the burner within the lampshade 123. Therefore, the blower 13 is generally referred to as a lamp blower of the projector 1. The two axial fans 14 are disposed in the lower casing body 111, and are located at one side of the lampshade 123 for driving air currents to cool the lampshade 123 and other optical components within the casing 11. Therefore, the axial fans 14 are generally referred to as system fans of the projector 1. The power supply 15 is disposed in the lower casing body 111, and is located at a front side of the two axial fans 14 for providing part of working voltage for the burner within the lampshade 123 of the light source module 121.

Figure 3:
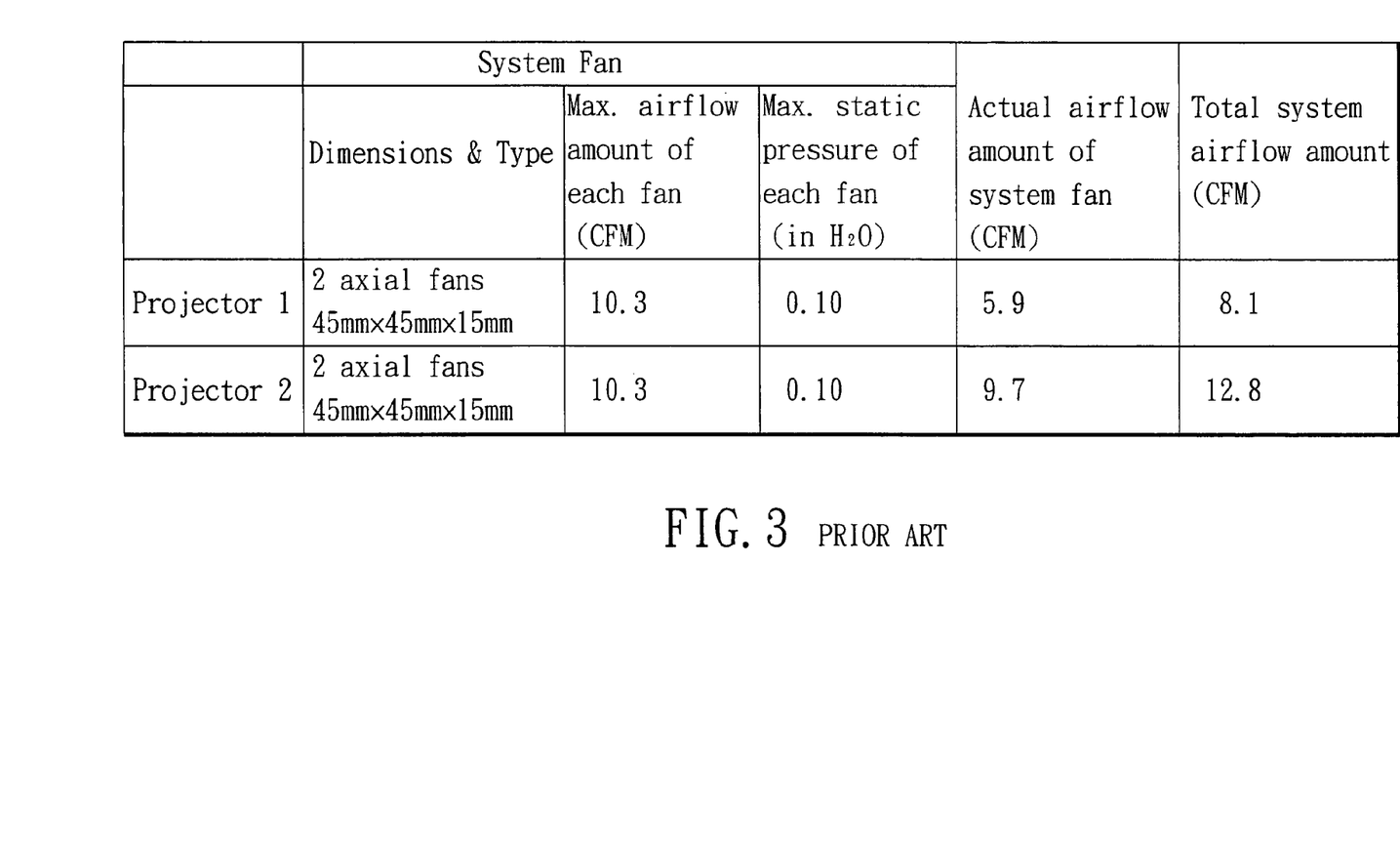
FIG. 3 is a table showing characteristics of system fans of the two conventional projectors mentioned above and the amount of airflow in the system calculated by using numerical simulation.

Referring to FIG. 1 and FIG. 3, FIG. 3 shows the characteristics of the system fans used by the projector 1 and the amount of airflow in the system calculated from numerical simulation. The length (L) width (W), and thickness (T) of each of the axial fans 14 of the projector 1 are 45 mm×45 mm×15 mm. The maximum amount of airflow calculated in the absence of air impedance is 10.3 CFM. However, the maximum static pressure that the axial fan 14 can provide is 0.1 in $H_2O$. That is, the capability of the axial fan 14 to resist air impedance is limited, and the axial fan 14 is incapable of effectively overcoming the high air impedance characteristic associated with a thin-type projector system. Consequently, after the maximum amount of airflow of 20.6 CFM that the two axial fans 14 provide is subjected to the air impedance within the system, the amount of airflow actually provided by the two axial fans 14 is merely 5.9 CFM, which, when combined with the amount of airflow provided by the blower 13, gives the amount of airflow of 8.1 CFM for the total system. This apparently cannot meet the requirements of the projector 1 which requires the amount of airflow of 10 CFM, thereby resulting in increased temperature during operation of the burner of the light source module 121. Therefore, when the air inside the system is discharged through an air outlet 113 in a rear side wall 112 of the lower casing body 111, the temperature at the air outlet 113 is also increased, thereby generating safety concerns and reducing system reliability.

Figure 2:
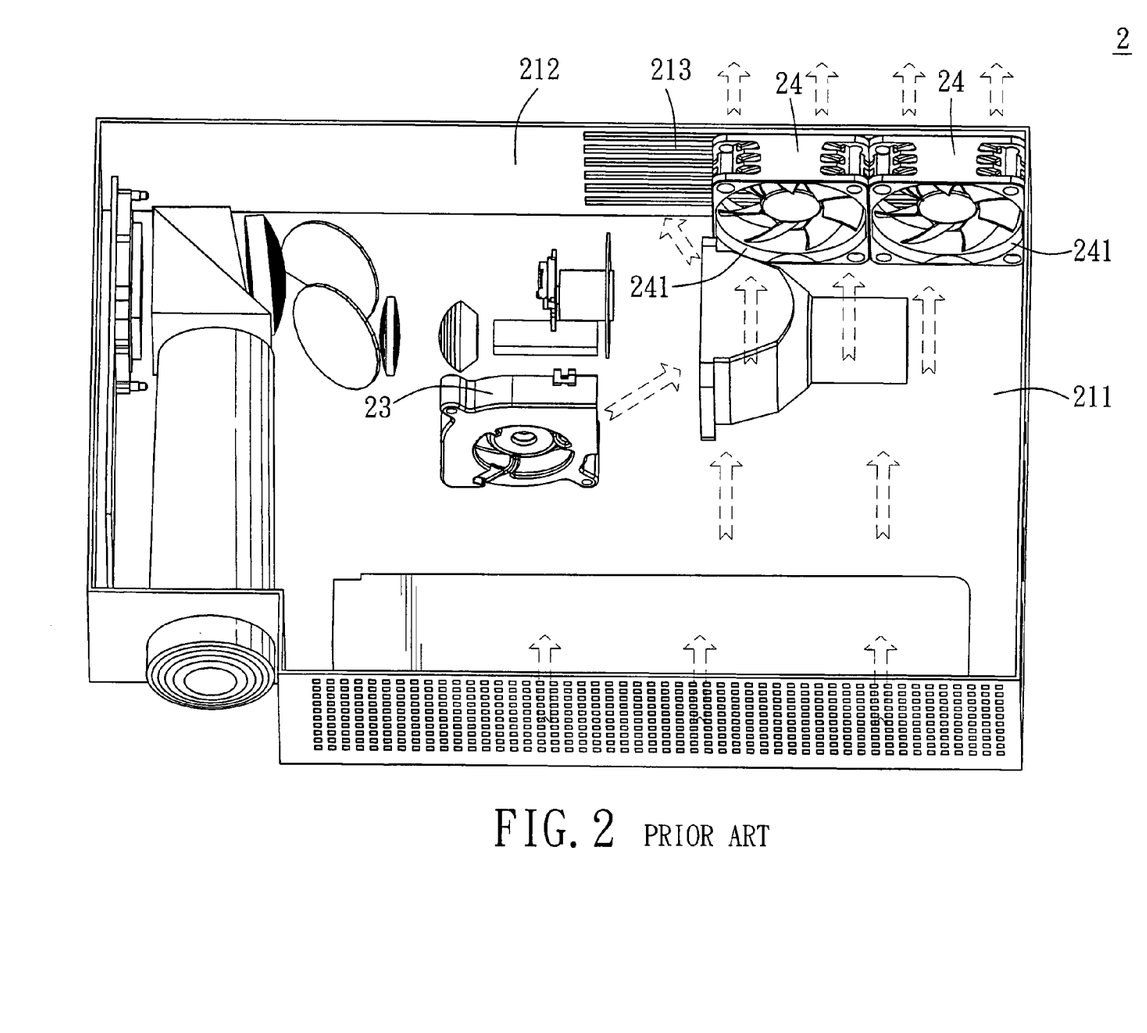
FIG. 2 is a schematic view showing an interior of another conventional projector.

Referring to FIG. 2, another conventional projector 2 is shown to have substantially the same structure as that of the conventional projector 1 shown in FIG. 1. The difference merely resides in that two axial fans 24 of the projector 2 are disposed on a rear side wall 212 of a lower casing body 211 immediately next to an air outlet 213. By varying the mounting positions of the two axial fans 24, the amount of airflow actually provided by the two axial fans 24 combined with the amount of airflow of a blower 23 reaches 12.8 CFM (as shown in FIG. 3). However, the amount of airflow actually provided by the two axial fans 24 is merely 9.7 CFM (as shown in FIG. 3), which is less than 50% of the maximum amount of airflow thereof. Therefore, the actual output efficiency is evidently unsatisfactory. In addition, since the two axial fans 24 draw in the hot air generated in the interior of the system via air inlets 241 of the axial fans 24 and discharge the same through the air outlet 213 in the rear side wall 212, the temperature around the air inlets 241 of the two axial fans 24 exceeds the highest working temperature (70° C.) of fans generally manufactured in the fan industry, and accordingly has a significant impact on the service life and reliability of the two axial fans 24.

On the other hand, a blower with a smaller thickness and larger length and width is currently used as a system fan in projectors in the industry. The blower is disposed in a casing of the projector in a horizontal fashion. However, in order to effectively provide the system with a sufficient amount of airflow, except for the thickness of the blower which is required to match the thickness of the casing and is therefore unalterable, the length and width of the blower need to be sufficiently large, so that the static pressure value of the blower is increased to provide airflow required by the system. Such an arrangement inevitably results in an increase in length and width of the casing of the projector, so that the projector occupies a relatively larger amount of space in use, and renders carrying of the projector inconvenient.

SUMMARY OF THE INVENTION

Therefore, an object of a preferred embodiment of the present invention is to provide a projecting device which, by means of arrangement of a blower of a heat-dissipating mechanism therein, is capable of providing a sufficient amount of airflow for a system to improve heat dissipation and enhance system reliability.

To achieve the aforesaid object, a preferred embodiment of the present invention accordingly proposes a projector device comprising a casing, an optical engine, and a heat-dissipating mechanism. The casing includes a lower casing body and an upper casing body covering the lower casing body. The optical engine is disposed in the casing, and includes a light source module. The heat-dissipating mechanism includes a first blower disposed uprightly in the casing and adjacent to one side of the light source module for driving airflow to cool the light source module and the casing. The first blower has a thickness greater than one half of a length thereof and one half of a width thereof.

In an embodiment of this invention, the first blower includes a first air inlet disposed at one side thereof, and an air outlet oriented toward the light source module. The first blower may further include a second air inlet located at the side thereof opposite to the first air inlet, and the first air inlet has a size greater than that of the second air inlet.

In an embodiment of this invention, the casing has a thickness less than 50 mm. The first blower has length, width and thickness dimensions of 45 mm×45 mm×40 mm.

In an embodiment of this invention, the heat-dissipating mechanism further includes a second blower. The second blower is uprightly disposed in the casing and adjacent to an open end of the light source module. The optical engine further includes an imaging module, which is disposed on a transmission path of a beam generated by the light source module. The imaging module, the light source module, the first blower, and the second blower are all disposed in the lower casing body. In addition, the projecting device may further comprise a control circuit board disposed on a bottom surface of the upper casing body. The control circuit board is electrically connected to the imaging module for controlling images projected by the imaging module.

In an embodiment of this invention, the projecting device further comprises a power supply disposed in the lower casing body and located at one side of the first blower. The first blower is located between the light source module and the power supply.

A preferred embodiment of this invention further proposes another projecting device in which, in addition to the components of the aforesaid projecting device, the heat-dissipating mechanism further includes a plurality of first blowers that are uprightly disposed at intervals in the casing and adjacent to one side of the light source module for driving airflow to cool the light source module and the casing.

In an embodiment of this invention, the air outlet of one of the first blowers in the projecting device is located at a top portion of the one of the first blowers, and the air outlets of the remaining ones of the first blowers are respectively located at bottom portions of the remaining ones of the first blowers.

Due to the arrangement of at least one first blower having the characteristics of providing high static pressure and a relatively high amount of airflow, the projecting device of a preferred embodiment of this invention provides a sufficient amount of airflow for the system to improve the heat-dissipating effect and enhance the reliability of the system, while reducing noise in the interior of the system. In addition, the arrangement of the first blower enhances flexibility in use, reduces the size of the casing in design so as to facilitate carrying, and at the same time lowers manufacturing and transport costs.

Other objectives, features and advantages of the present invention will be further understood from the further technological features disclosed by the embodiments of the present invention wherein there are shown and described preferred embodiments of this invention, simply by way of illustration of modes best suited for carrying out the invention.

BRIEF DESCRIPTION OF THE DRAWINGS

Other objectives, features and advantages of the present invention will become apparent in the following detailed description of the two preferred embodiments with reference to the accompanying drawings, of which.

DETAILED DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 4:
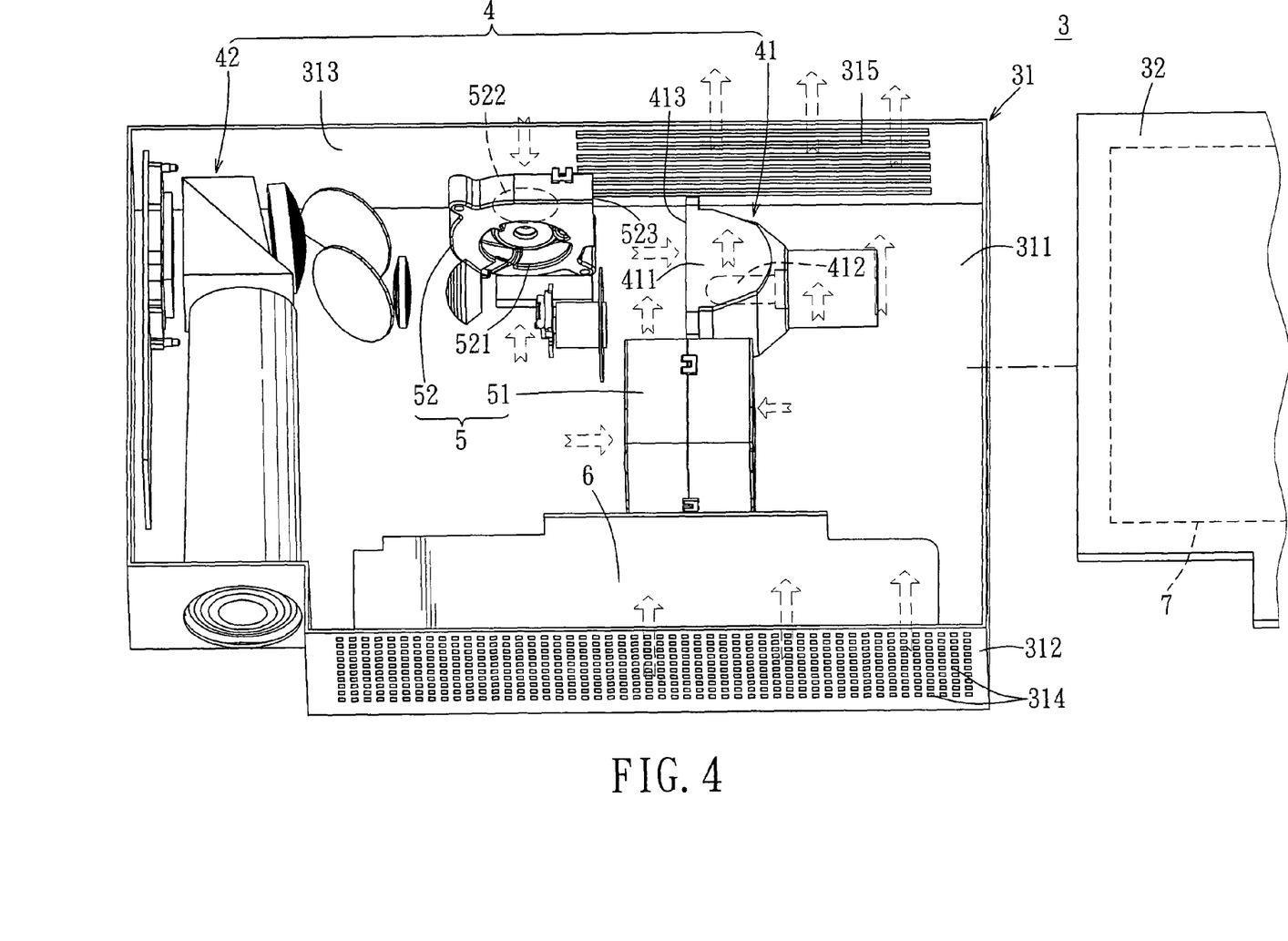
FIG. 4 is a schematic view to illustrate an interior of a projecting device according to a preferred embodiment of the present invention.

Referring to FIG. 4, a projecting device 3 according to a preferred embodiment of the present invention is shown to include a casing 31, and an optical engine 4, a heat-dissipating mechanism 5, a power supply 6, and a control circuit board 7 respectively disposed in the casing 31.

In this embodiment, the casing 31 has a thickness (or height) less than 50 mm, and includes a lower casing body 311 and an upper casing body 32 covering the lower casing body 32. The lower casing body 311 has a front side wall 312 and a rear side wall 313. The front side wall 312 is formed with a plurality of air inlets 314 for entry of airflow. The rear side wall 313 is formed with a plurality of air outlets 315 for exit of airflow. The air outlets 315 are in the form of a plurality of elongated through holes that are disposed horizontally and in juxtaposition to each other. The optical engine 4 includes a light source module 41 and an imaging module 42 disposed in the lower casing body 311 of the casing 31, as well as other optical components which are not crucial to a preferred embodiment of the present invention and which are therefore omitted herein for the sake of brevity. The light source module 41 has a lampshade 411 and a burner 412 disposed in the lampshade 411. The light source module 41 further has an open end 413 on the lampshade 411. The imaging module 42 is disposed in the lower casing body 311, and is located on a transmission path of a beam generated by the light source module 41.

The heat-dissipating mechanism 5 includes a first blower 51 and a second blower 52. The first blower 51 is disposed in the casing 31 and adjacent to one side of the light source module 41. The second blower 52 is disposed in the casing 31 and adjacent to the open end 413 of the light source module 41. In this embodiment, the first blower 51 is, for example, a system fan in the projecting device 3. The second blower 52 is, for example, a lamp blower in the projecting device 3. The control circuit board 7 is disposed on a bottom surface of the upper casing body 32, and is electrically connected to the imaging module 42 for controlling images projected by the imaging module 42. The power supply 6 is disposed at the front side wall 312 in the lower casing body 311, and is located at one side of the first blower 51 for providing working voltages for the burner 412 of the light source module 41 and the control circuit board 7 during operation.

Figure 5:
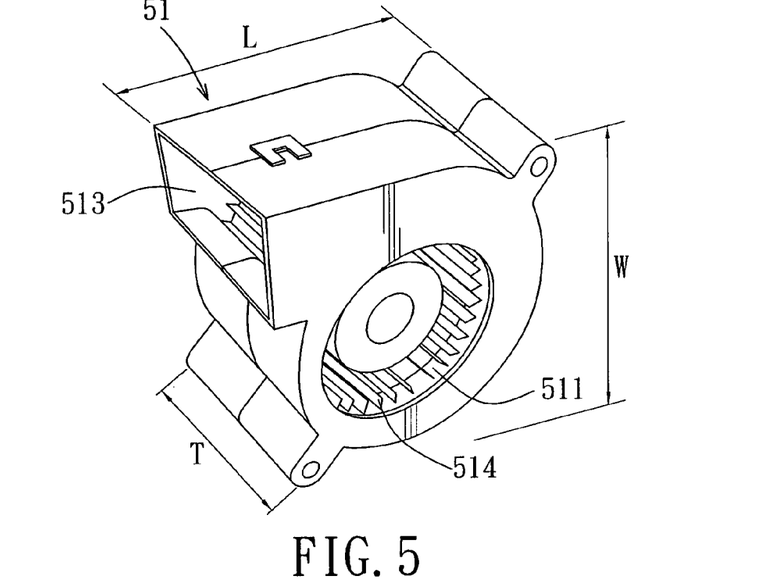
FIG. 5 is a perspective view to illustrate a first blower of FIG. 4 from the right side.
Figure 6:
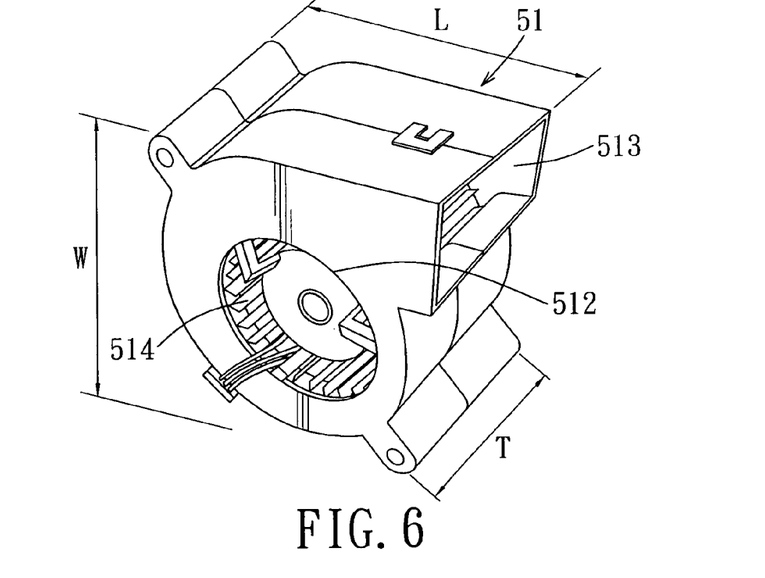
FIG. 6 is a perspective view to illustrate the first blower of FIG. 4 from the left side.

More specifically, referring to FIGS. 4, 5, and 6, the first blower 51 is disposed uprightly in the lower casing body 311, and is located between one side of the light source module 41 and the power supply 6 for driving airflow to cool the light source module 41 and the casing 31. The thickness of the casing 31 is, for example, 49 mm. The length (L), width (W), and thickness (T) of the first blower 51 are, for example, 45 mm×45 mm×40 mm. The first blower 51 has a first air inlet 511, a second air inlet 512 located at the side opposite to the first air inlet 511, and a substantially rectangular air outlet 513 oriented toward the light source module 41. The first air inlet 511 has a diameter larger than that of the second air inlet 512. The second blower 52 is disposed uprightly at the rear side wall 313 in the lower casing body 311, and is located in front of the open end 413 of the lampshade 411. The second blower 52 includes a first air inlet 521, a second air inlet 522, and an air outlet 523 oriented toward the open end 413 of the lampshade 411. The first and second air inlets 521, 522 are provided to draw in airflow for subsequently exhausting the airflow through the air outlet 523 to cool the burner 412 in the lampshade 411.

Figure 7:
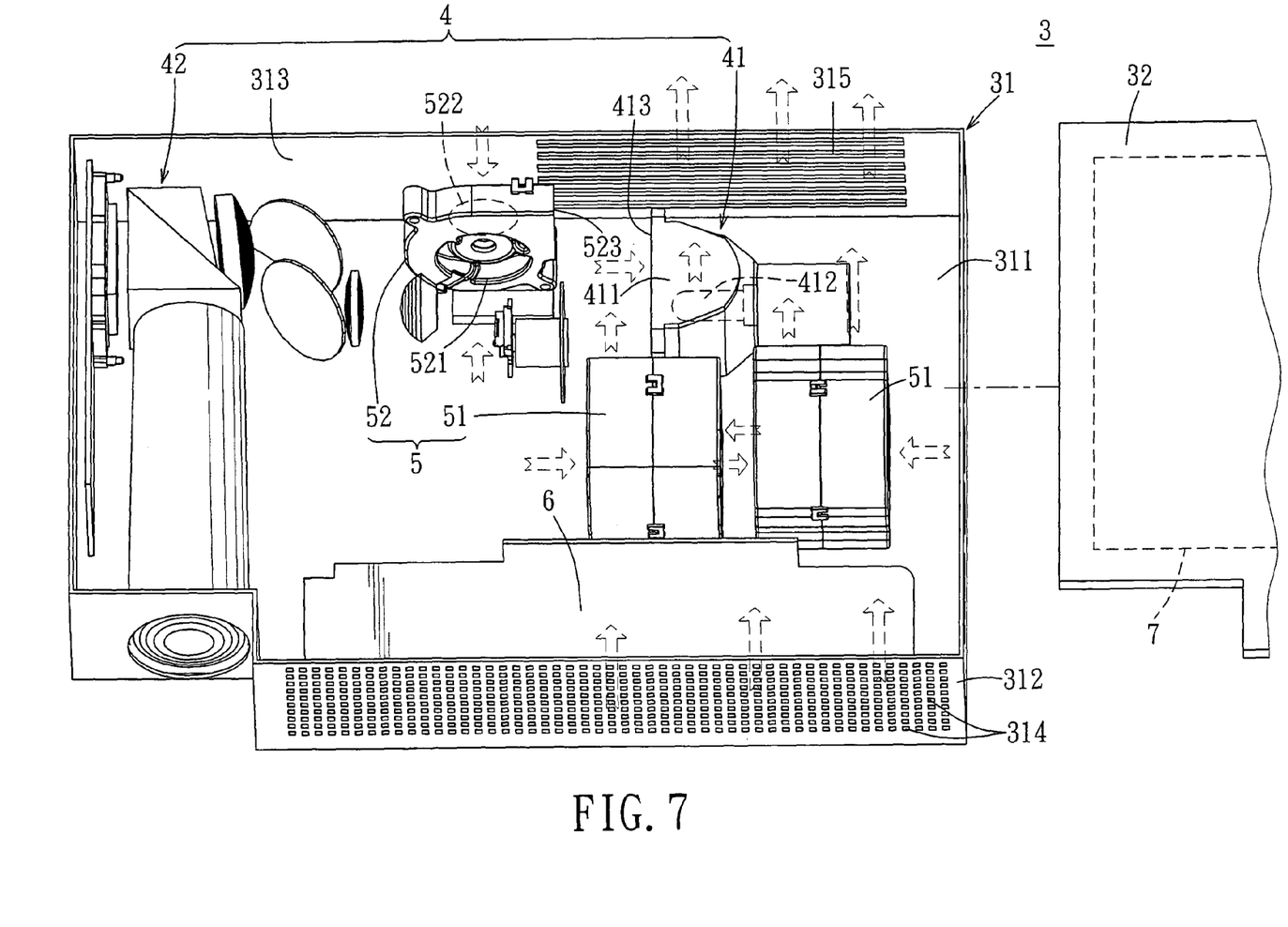
FIG. 7 is a schematic view to illustrate an interior of a projecting device according to another preferred embodiment according to the present invention.

In another embodiment of this invention as shown in FIG. 7 (the numbering of the elements is the same as that in FIG. 4), a projecting device 3 is substantially the same as that in the previous embodiment shown in FIG. 4 in terms of construction and arrangement, the difference residing in that a heat-dissipating mechanism 5 includes a plurality of first blowers 51 serving as system fans, and a second blower 52 serving as a lamp blower. In this embodiment, the first blowers 51 are exemplified to be two in number.

Figure 8:
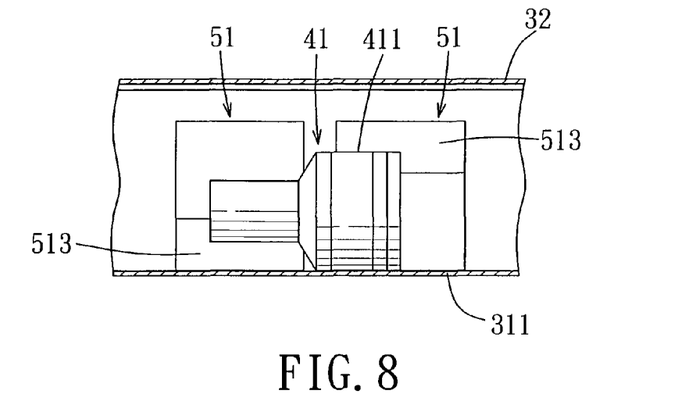
FIG. 8 is a partially enlarged rear side view of the preferred embodiment of FIG. 7, illustrating the arrangement relationship between two first blowers and a lamp.
Figure 9:
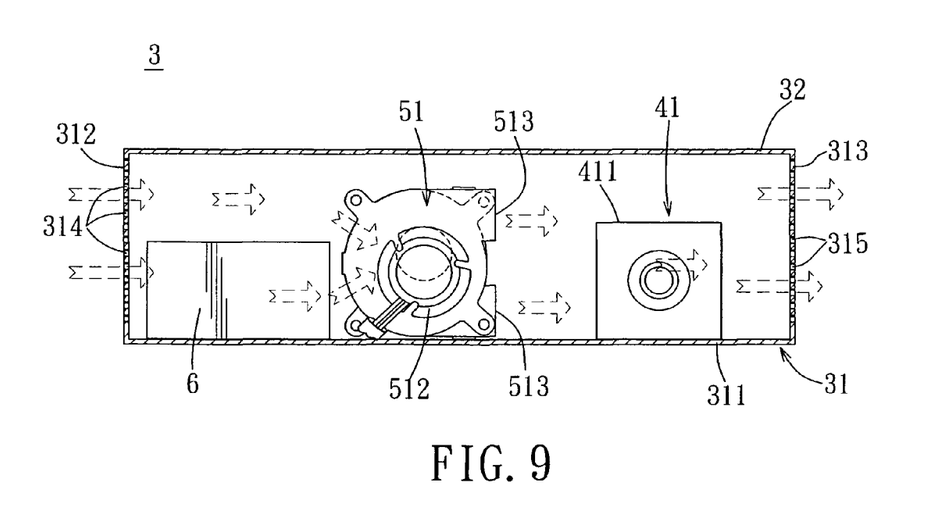
FIG. 9 is a front side view of the preferred embodiment of FIG. 7.

Referring to FIGS. 7, 8 and 9, the two first blowers 51 are uprightly disposed at intervals in the lower casing body 311 of the casing 31, and are located between the lampshade 411 of the light source module 41 and the power supply 6.

The air outlets 513 of the two first blowers 51 are both oriented in the direction facing the light source module 41, with the air outlet 513 of one of the first blowers 51 (the first blower 51 on the left side of FIG. 7) located at a top portion. The other of the first blowers 51 (the first blower 51 on the right side of FIG. 7) is upturned 180 degrees so that the air outlet 513 thereof is located at a bottom portion. Thus, the air outlets 513 of the two first blowers 51 are oriented toward the lampshade 411 of the light source module 41 with one above the other. In addition, since the first blower 51 on the right side is upturned 180 degrees before being disposed in the lower casing body 311, the first air inlet 511 (referring to FIG. 5) or the second air inlet 512 of one of the first blowers 51 corresponds to the first air inlet 511 or the second air inlet 512 of the other one of the first blowers 51.

Due to the spaced arrangement of the two first blowers 51, both the first and second air inlets 511, 512 of the two first blowers 51 permit intake of air. With such a two-way air intake design, and as the rotational speed of blades 514 (referring to FIG. 5) of the first blowers 51 of this embodiment is the same as that of blades (not shown) of blowers permitting one-way air intake as commonly used in the prior art, the first blowers 51 of this embodiment provide a greater amount of airflow compared with those permitting one-way air intake. In addition, since a diameter of the first air inlet 511 is larger than that of the second air inlet 512, the air intake amount of the first air inlet 511 is greater than that of the second air inlet 512. Therefore, with the two first blowers 51 arranged in the lower casing 311, the distance between the two first blowers 51 is reduced, without increasing impedance generated during intake of air at the second air inlet 512. Besides, the air outlets 513 of the two first blowers 51 may be made to align with the lampshade 411 for cooling the exterior of the lampshade 411. It is noted that the air outlets 513 of the two first blowers 51 may be connected respectively to air guides (not shown), so that air blown out through the air outlets 513 are directly guided to the lampshade 411, thereby enhancing the efficiency of cooling the exterior of the lampshade 411 of the light source module 41.

It is further noted that, as shown in FIGS. 8 and 9, since the air outlets 513 of the two first blowers 51 are arranged with one above the other, the air blown out through one of the air outlets 513 adjacent to the upper casing body 32 cools an upper portion of the lampshade 411 of the light source module 41 and the upper casing body 32, whereas air blown out through the other one of the air outlets 513 adjacent to the lower casing body 311 cools a lower portion of the lampshade 411 of the light source module 41 and the lower casing body 311. Thus, the upper and lower portions of the lampshade 411 of the light source module 41 are effectively and evenly cooled to improve the heat dissipating effect.

In addition, the air outlets 513 of the two first blowers 51 may be further connected to a branched air guide (not shown) so as to guide portions of the air blown out through the air outlets 513 to the interior of the lampshade 411 to cool the burner 412 (referring to FIG. 7). Thus, this arrangement may dispense with the lamp blower, namely the second blower 52, and may therefore lessen the number of blowers or fans in the projecting device 3, reduce weight, and lower manufacturing cost.

On the other hand, for different application environments, the length (L), width (W) and thickness (T) of a blower is currently designed to be 45 mm×45 mm×20 mm, 60 mm×60 mm×25 mm, 75 mm×75 mm×30 mm or larger. These dimensions are generally at a ratio of 1:1:less than ½. That is, the thickness (T) is less than one half of the length (L) or one half of the width (W). Blowers have the characteristic of providing high static pressure, i.e., the blowers have a high ability to resist air impedance within the system, while the maximum amount of airflow provided by blowers is smaller than that provided by axial fans. In order that the blowers may also have the characteristic of providing a large amount of airflow the same as that provided by the axial fans in addition to providing high static pressure, the thickness (T) of the first blowers 51 in this embodiment is particularly increased so that the amount of airflow thereof is increased with the thickness, and so that the first blowers 51 provides a larger amount of airflow compared with conventional blowers with a smaller thickness used in the prior art. Accordingly, the dimensions of the first blowers 51 in the embodiments of this invention are at a ratio of 1:1:greater than ½, i.e., the thickness (T) of the first blowers 51 is greater than one half of the length (L) and one half of the width (W).

Figure 10:
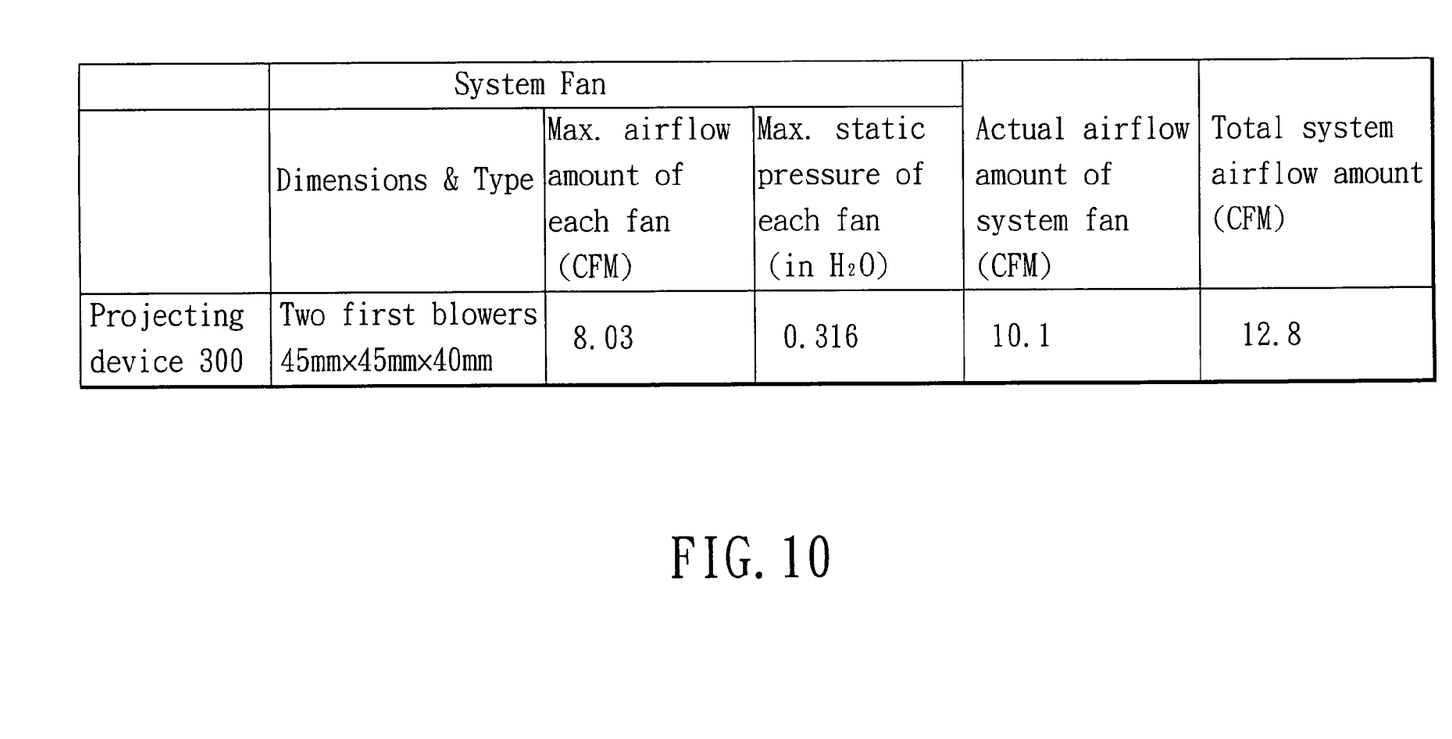
FIG. 10 is a table showing characteristics of a system fan of FIG. 7 and the amount of airflow in the system calculated by using numerical simulation.

As shown in FIG. 10, which illustrates characteristics of a system fan of the projecting device 3 and the amount of airflow in the system calculated from numerical simulation, the maximum amount of airflow of each of the first blowers 51 of the system fan is 8.03 CFM. The maximum static pressure value is 0.316 in $H_2O$. The maximum amount of airflow that is provided by the two first blowers 51 is 16.06 CFM, which, after being subjected to air impedance within the system and combined with the amount of airflow provided by the second blower 52, may reach 12.8 CFM. Such an amount of airflow can meet the requirement of the system of the projecting device 3 for an amount of airflow greater than 10 CFM. Thus, a satisfactory heat dissipating effect is achieved to lower the temperature of the interior of the system and to enhance the system reliability of the projecting device 3.

In addition, due to the high static pressure characteristic of the first blowers 51, the amount of airflow actually provided by the system fan including the two first blowers 51 may reach 10.1 CFM, which exceeds 50% of the maximum amount of airflow provided by the two first blowers 51. Therefore, the system fan including the two first blowers 51 not only provides a relatively large amount of airflow which is comparable to that provided by axial fans, it also provides a higher static pressure characteristic compared to axial fans. Thus, the large-thickness first blowers 51 are more suited for use as a system fan of the thin-type projecting device 3.

Furthermore, compared with blowers having a uniform, smaller thickness but larger length and width in the prior art, the use of several first blowers 51 which have a larger thickness but smaller length and width as a system fan permits more flexibility, a reduction in the size of the casing 31 in design so as to facilitate carrying, and lower manufacturing and transport costs when the system fan is arranged in the casing 31 of the projecting device 3. Under the circumstance that the rotational speed is not increased, the arrangement of the two first blowers 51 increases the amount of airflow by one fold compared to the use of a single blower. Compared with the use of a single blower whose rotational speed is increased in order to enhance the amount of airflow, the arrangement of several first blowers 51 achieves the effect of reducing noise.

It is noted that, in the aforesaid embodiments, although the heat-dissipating mechanism 5 is designed to include two first blowers 51, the number of the first blowers 51 may vary with the power of the light source module 41 in design. When the lighting power of the light source module 41 is less than 200 W, the heat-dissipating mechanism 5 may use one uprightly disposed first blower 51 as a system fan, and when the lighting power of the light source module 41 is greater than 200 W, the heat-dissipating mechanism 5 may use a plurality of uprightly disposed and spaced-apart first blowers 51 as a system fan.

In sum, due to the arrangement of at least one first blower 51 having the characteristics of providing high static pressure and a relatively large amount of airflow, the projecting device 3 of the embodiments of this invention provides a sufficient amount of airflow for the system to improve the heat-dissipating effect and enhance the reliability of the system, while reducing noise in the interior of the system. In addition, the arrangement of the first blower 51 enhances flexibility in use, reduces the size of the casing 31 in design so as to facilitate carrying, and at the same time lowers manufacturing and transport costs, thereby positively achieving the intended one or some or all of the objects of this invention.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

We claim:
1. A projecting device, comprising:
   a casing including a lower casing body and an upper casing body covering said lower casing body;
   an optical engine disposed in said casing, said optical engine including a light source module; and
   a heat-dissipating mechanism including:
      a first blower disposed in said casing and adjacent to one side of said light source module for driving airflow to cool said light source module and said casing, said first blower having a thickness greater than one half of a length of said first blower and greater than one half of a width of said first blower.

2. The projecting device according to claim 1, wherein said casing has a thickness less than 50 mm, and said first blower has length, width and thickness dimensions of 45 mm×45 mm×40 mm.

3. The projecting device according to claim 1, wherein said first blower includes a first air inlet, and an air outlet oriented toward said light source module.

4. The projecting device according to claim 1, wherein said heat-dissipating mechanism further includes a second blower, said second blower being disposed in said casing and adjacent to an open end of said light source module.

5. The projecting device according to claim 1, further comprising a power supply disposed in said lower casing body and located at one side of said first blower, said first blower being located between said light source module and said power supply.

6. The projecting device according to claim 3, wherein said first blower further includes a second air inlet, said second air inlet being located at one side of said first blower opposite to said first air inlet, said first air inlet having a size greater than that of said second air inlet.

7. The projecting device according to claim 4, wherein said optical engine further includes an imaging module, said imaging module being located on a transmission path of a beam generated by said light source module, said imaging module, said light source module, said first blower, and said second blower being disposed in said lower casing body.

8. The projecting device according to claim 7, further comprising a control circuit board disposed on a bottom surface of said upper casing body, said control circuit board being electrically connected to said imaging module for controlling images projected by said imaging module.

9. A projecting device, comprising:
a casing including a lower casing body and an upper casing body covering said lower casing body;
an optical engine disposed in said casing, said optical engine including a light source module; and
a heat-dissipating mechanism including:
a plurality of first blowers that are disposed at intervals in said casing and adjacent to one side of said light source module for driving airflow to cool said light source module and said casing, each of said first blowers including a first air inlet, a second air inlet located at one side of said first blower opposite to said first air inlet, and an air outlet oriented toward said light source module, said first air inlet having a size greater than that of said second air inlet.

10. The projecting device according to claim 9, wherein said air outlet of one of said first blowers is located at a top portion of said one of said first blowers, and said air outlets of remaining ones of said first blowers are located at bottom portions of said remaining ones of said first blowers.

11. The projecting device according to claim 9, wherein each of said first blowers has a thickness greater than one half of a length of the corresponding one of said first blowers and greater than one half of a width of the corresponding one of said first blowers.

12. The projecting device according to claim 9, wherein said heat-dissipating mechanism further includes a second blower, said second blower being disposed in said casing and adjacent to an open end of said light source module.

13. The projecting device according to claim 9, further comprising a power supply disposed in said lower casing body and located at one side of said first blowers, said first blowers being located between said light source module and said power supply.

14. The projecting device according to claim 9, wherein said first blowers are disposed such that said first air inlets thereof face away from each other, and that said second air inlets thereof face toward each other.

15. The projecting device according to claim 11, wherein said casing has a thickness less than 50 mm, each of said first blowers having length, width and thickness dimensions of 45 mm×45 mm×40 mm.

16. The projecting device according to claim 12, wherein said optical engine further includes an imaging module, said imaging module being located on a transmission path of a beam generated by said light source module, said imaging module, said light source module, each of said first blowers, and said second blower being disposed in said lower casing body.

17. The projecting device according to claim 16, further comprising a control circuit board disposed on a bottom surface of said upper casing body, said control circuit board being electrically connected to said imaging module for controlling images projected by said imaging module.

* * * * *